United States Patent [19]
Brockman et al.

[11] Patent Number: 5,282,342
[45] Date of Patent: Feb. 1, 1994

[54] STORAGE TERMINAL SHELTER, INCLUDING HEAD PAD AND SIDE PAD ASSEMBLIES FOR TRUCK CLOSURE AT DOCKING STATIONS

[75] Inventors: Thomas R. Brockman, Kenton; Mark Dillon, Upper Sandusky, both of Ohio

[73] Assignee: Fairborn USA Inc., Upper Sandusky, Ohio

[21] Appl. No.: 71,496

[22] Filed: Jun. 4, 1993

[51] Int. Cl.⁵ .......................................... E04H 14/00
[52] U.S. Cl. .................................................. 52/173
[58] Field of Search .............. 52/173 DS, 2.11; 14/71, 14/71.5

[56] References Cited
U.S. PATENT DOCUMENTS 3,352,314 11/1967 Frommelt et al. ............. 52/173 DS
4,601,142 7/1986 Frommelt .
4,638,612 1/1987 Bennett .
4,711,059 12/1987 Layne .
4,718,207 1/1988 Frommelt .
5,185,977 2/1993 Brockman et al. .

Primary Examiner—Carl D. Friedman
Assistant Examiner—Creighton Smith
Attorney, Agent, or Firm—David H. Semmes

[57] ABSTRACT

A warehouse terminal building shelter defining a truck dock and seal, wherein a head pad assembly includes a head pad pivot assembly which is anchored forwardly, within the head pad assembly and secured in spring-biased relation thereto. Opposed side pads are covered and reinforced by tension tie straps secured to the blockouts forwardly thereof and in coactive sealing disposition beneath the pivot assembly. Each side pad is of L-shape configuration in cross-section, the side pads being deformable inwardly, relative to the shelter and its head pad.

8 Claims, 3 Drawing Sheets

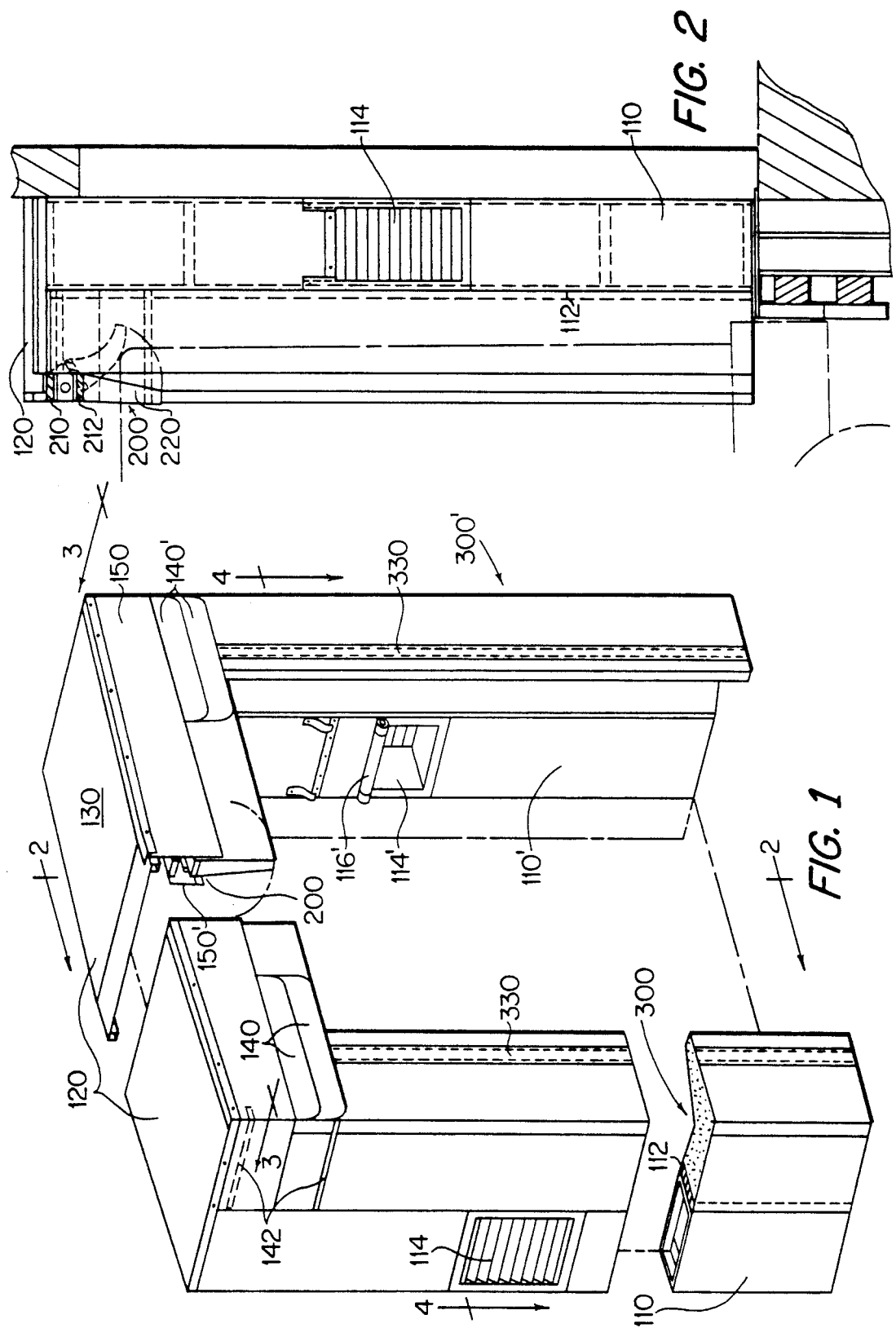

STORAGE TERMINAL SHELTER, INCLUDING HEAD PAD AND SIDE PAD ASSEMBLIES FOR TRUCK CLOSURE AT DOCKING STATIONS

BACKGROUND OF THE INVENTION

In loading and off-loading trucks, including, tractor-trailer trucks, it is desirable to seal the area between terminal dock and truck against inclement weather. At the same time, it is important to provide such a combined shelter and dock seal as will withstand periodic vehicle misalignment and/or abuse. Accordingly, the present invention is adapted to provide at a warehouse or building dock a protective unit that presents a weather-tight seal when engaged by trailer or truck, whereby truck rear doors may be opened beyond the dock into the interior of the building. It is desirable that such a dock shelter not only permit complete and unobstructed open door access, but also provide fail-safe weather protection.

The shelter herein is mounted along the outer perimeter of the dock opening of the warehouse or terminal building. It is imperative that such a shelter permit free loading/unloading access to the open interior of the truck. Likewise, the truck body should be sealable by a head pad assembly within the shelter. More specifically, the invention is an interdependent head pad and side L-pad dock seal unit. The unit is sufficiently versatile to accommodate a truck/trailer which is out of position relative to dock center as defined by the building construction. The dock center is determined by bumpers and dock sills which are fixed, adjacent the door opening of the building.

DISCUSSION OF THE PRIOR ART

There follows a listing of the patented art as it relates to the side curtain assembly for trailer hinge gap closure of this invention:

| FROMMELT | 7/22/86 | Pat. No. 4,601,142 |
| BENNETT | 1/27/87 | Pat. No. 4,638,612 |
| LAYNE | 12/08/87 | Pat. No. 4,711,059 |
| FROMMELT | 01/12/88 | Pat. No. 4,718,207 |
| BROCKMAN et al | 2/16/93 | Pat. No. 5,185,977 |

In none of the afore-cited patents is the combination of applicant's dock seal shelter shown or described. The following description, drawings and claims define the distinctive coactive relationship of key elements of the invention.

SUMMARY OF THE INVENTION

Every time one opens a warehouse roll-up door to gain access to a covered truck body, there is a transfer of inside and outside air that causes building energy loss. For example, with an open, unsealed 8'×8' loading door, this may currently cost some thousands of dollars a year, per door in air conditioning and/or heating energy loss, in excess of a thousand dollars a year. The present form fitting dock seal units present an effective barrier between the two listed environments, while permitting materials handling personnel unobstructed access to the truck and its contents.

This is a loading dock shelter with dock seal having opposed side pad and head pad polyurethane foam sealing elements for utility when a truck is backed into a loading dock, to thereby form a protective weather seal. In this instance, doors of the truck are opened to the building interior. When in use, that is to say, when the truck is in the dock, the reverse mobility of the truck causes the side L-pad assemblies to be deflected from normal inoperative position, and to bend them rearwardly along the fixed sides of the truck, whereby the assemblies fill both left and right gaps created by the truck body, preparatory to, during loading and off-loading. The side pad assemblies are moved inwardly from the shelter to operative position, to fill all exposed portions of the gaps between the rear terminus of the truck and of the shelter dock walls. Left and right assemblies are independently compressible to compensate for truck misalignment. Thus a complete seal is presented as between the trailer which may or may not be centered in the dock. In fact, a pivoting head pad assembly with spring-bias assures foam compression to the top of docking vehicle, excluding moisture infiltration, while allowing full height access to the rear of the vehicle.

The terms DYNAFLEX TM and DYNALON TM refer to durable fabrics which cover the assembled elements of the invention.

BRIEF DESCRIPTION OF THE DRAWINGS

FIG. 1 is a view in perspective of the present dock shelter, bearing head pad and associated side pads.

FIG. 2 taken long lines 2—2 of FIG. 1 is a vertical section, side view of preferred head pad assembly, depicting both operative and inoperative truck sealing modes thereof.

DESCRIPTION OF PREFERRED EMBODIMENTS

Figure 3:
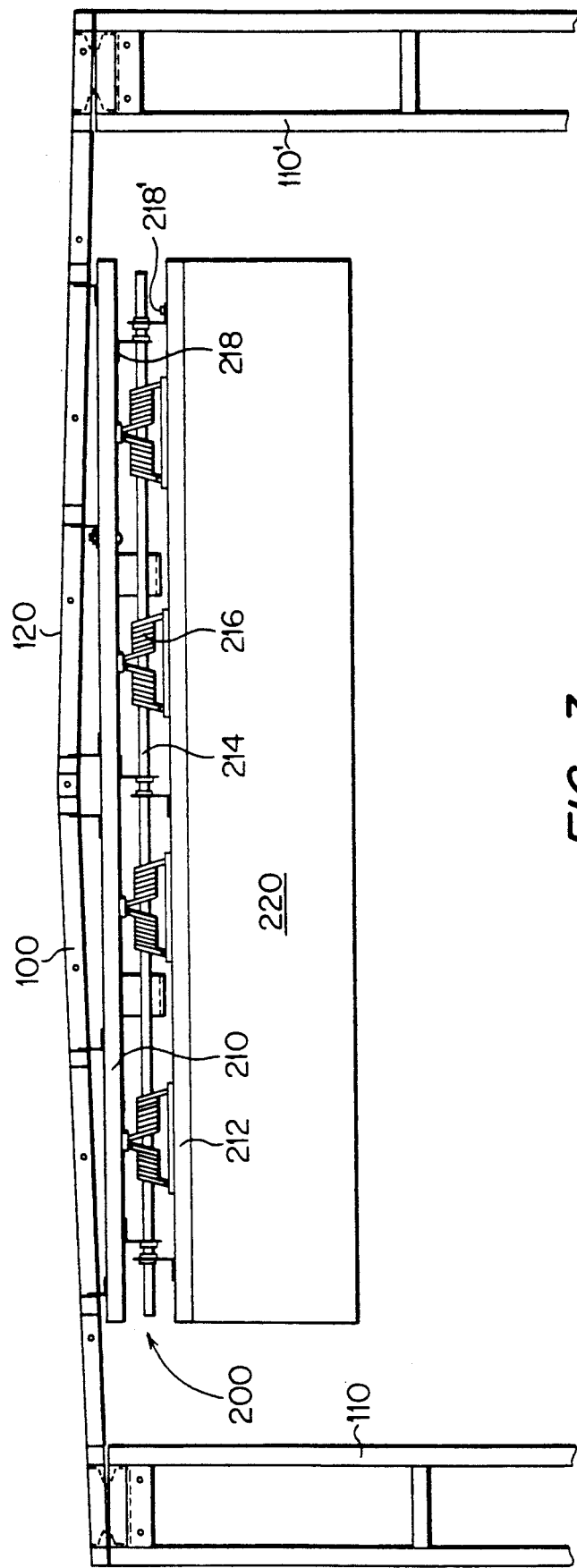
FIG. 3 is an enlarged vertical section front view of the FIGS. 1 and 2 head pad assembly, according to the invention, taken along lines 3—3 of FIG. 1.

Referring to FIG. 1, the L-pad dock seal unit is represented in its entirety by this view wherein the unit 100 is shown to include head pad pivot assembly 200 and corresponding opposed side pad assemblies 300-300'. The assemblies 300-300' are coactively disposed relative to the head pad assembly to effect a substantially complete truck seal to the dock upon positioning of the truck/trailer for its loading and/or unloading functions.

Referring again to FIG. 1, it will be noted that the head curtain 150 encases-in-part the wear pleats 140-140' which secure rearwardly to a blockout 110-110' by means of pleat tie-backstraps 142. Since these wear pleats are not directly attached to the side pads, they comprise an independent armor pleat assembly, closing the transition gap between the respective side pads and the head pad, either when contacted by the truck/trailer or when disconnected therefrom.

The head pad assembly 100 is supported in part adjacent the building by fabric covered side pad blockouts 110-110'. The head frame 120 comprises not only a translucent fiberglass sheet roofing 130 for the unit, but also means of securing it below the head pad pivot assembly 200 at the forwardmost position of the shelter, relative to the building dock. The translucent roofing affords light entry into the docking zone beneath it. The blockouts 110-110' stable backing provide for the side pads. Each include, midway between top and bottom, ventilating louver units 114-114' which support fabric panel roll ups 116-116'. The roll-ups are adapted to seal the interior of the blockouts during inclement weather. As indicated in FIG. 2, the blockouts 110-110' in some cases may be set upon the dock sill of the building. Side pads 300-300' are fixed contiguous the blockouts and set immediately above the spring bumper projections of the building. Where dock conditions demand it, fabricated blockouts provide greater unit projection, insuring proper vehicle entry while at the same time maintaining dock seal stability.

As shown in FIGS. 1 and 3, head frame 120 carries the head pad pivot assembly 200. A fixed anchor and stringer 210 depends from the roof 120 and extends transversely of the head pad assembly 100 from which depend means for supporting a hinge pin for the head pad 220, per se. Beneath the fixed pad stringer 210 and in spaced relation thereto, lies the hinge pad connector 212 with hinge pin 214 set between them. The connector 212 is spring-biased by helical torsion springs 216, which are removably supported upon hinge pin 214. The lowermost and free portions of the springs stub upon the movably supported pad connector 212. At spaced intervals, between respective fixed and moveable hinge elements 210-212, are opposed pairs of fixed hinge stays 218-218', the latter having a moveable relationship relative to the former, due to hinge pin connection. Dependent from the moveable connector 212 is the head pad 220 itself. It is a rotational polyurethane foam formed head pad, spring-centered, reinforced by a fabric cover of DYNALON TM. The head pad is bounded by moveable curtains 150-150', front and rear.

Figure 4:
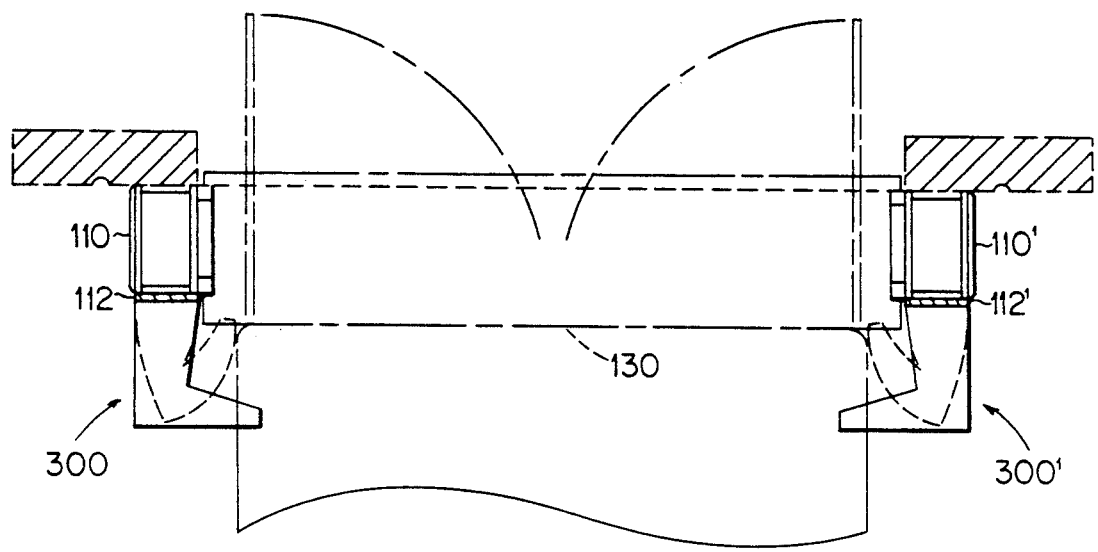
FIG. 4 is an enlarged horizontal plan and section view, depicting opposed side pad units of the FIG. 1 assembly, reference lines 4—4 of FIG. 1.
Figure 5:
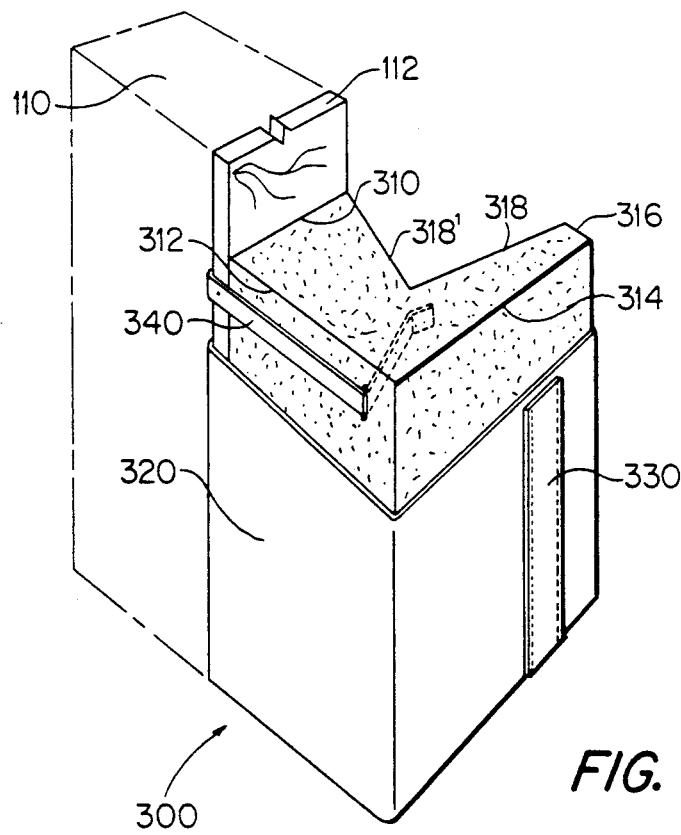
FIG. 5 is partial, enlarged isometric view of one covered side pad assembly with associated supports and reinforcement therefor.

Referring to FIGS. 4 and 5, the opposed side pads 300-300' are illustrated, the same being covered on the sides by a protective material such as DYNAFLEX TM and at the face by protective material such as DYNALON TM and fixed to vertically extending frames 112-112', projecting panels of blockouts 110-110'. Each tie reinforced polyurethane foam pad is preferably set against its frame by a chemical weld at its rearmost panel 310, said panel having an exterior right-angled connection panel 312, terminating at a right angle with abutment panel 314. Panel 314 is followed by intermediate panel 316, the same having acute angle connection with panel 318 and its counterpart 318', which joins to the rearmost panel 310, to complete the horizontal cross-section profile. The outline of the profile is thus hexagonal. This unit 300 is, as indicated, reinforced by vertically spaced, return tie straps 340, each is anchored to frame 112 and passes from pad exterior 312, through the pad, at an acute angle, terminating on the inside portion 318 thereof by sewn connection with the interior of encasing cover 320. These plural, internal tie straps comprise cover-pad tensioning means over the foam core, a second portion of which extends along the outer side panel 312 of the pad beneath the cover, its front portion being secured rearwardly to the frame member and a third portion extending diagonally through the pad body and is thence secured to the inner side of the cover 320. In disposition, pads 300-300' extend inwardly of the dock a sufficient distance to exceed the dimension between opposed jambs forming the dock door itself. To reiterate, each one of the internal tie straps is attached at its near end to the inside of the cover 320, whereas the far end is secured to the rear of frame member 112, which lies contiguous the front of blockout 110. As indicated, the L-shaped side pads 300-300' allow full width access to the rear of a docked vehicle. Sealing action of an L-pad is enhanced by the rebound action of return strap 340, incorporated by stitching attached to interior of crotch of "L" routed through a hole in the foam pad to exterior thereof, just beneath fabric cover 320, then routed rearward to side pad wood frame 112 where strap is secured. Both side pads 300-300' and head pad 200 have superior performance DYNALON TM fabric cover reinforcement, provided across pad faces and inside edges of the pad (tip). Said reinforcement shall extend a minimum of 2" onto the projection side of the pad and to the rear portion of the pad face to allow for the reinforcement to be sewn in place without exposing the stitching to potential vehicle contact.

Truck guide stripes 330 are stitched to the cover 320, their vertical dimension coinciding with the length of respective side pads 300. See FIGS. 1 and 5.

Having defined the preferred apparatus in detail, the scope of invention is identified in the annexed claims.

We claim:

1. A warehouse terminal building shelter defining at least one truck dock and seal, each seal comprising:
   a) a head pad assembly, supported by opposed and projecting blockouts 110-110' which are fixed upright of the terminal building;
   b) a head pad pivot assembly 200, anchored forwardly, within the head pad assembly 100 and in spring-biased relation thereto;
   c) covered, opposed side pad assemblies 300-300', each pad thereof being reinforced by tension tie straps secured to respective blockouts 110-110' forwardly thereof and in coactive sealing disposition beneath said pivot assembly 200, each said side pad being of L-shape configuration in cross-section, said side pads each being deformable inwardly, relative to the shelter and its head pad assembly, whereby upon deformation of said side pads by a docking truck, there is full truck width access within the truck dock.

2. The warehouse building shelter and truck dock seal of claim 1 wherein the head pad pivot assembly 200 comprises a pivotally mounted head pad 220 which depends downwardly from the head pad assembly at a forwardmost terminus thereof, said head pad 220 being flexible and pivotally responsive to inwardly imposed truck compression forces, to effect a head seal between shelter and truck; said side pads 300-300' likewise being truck compressible inwardly to effect side seals between shelter and truck, said respective head pad and side pads having sealing contact with the truck upon positioning of the truck in its load/unload position, relative to the dock and shelter.

3. The shelter seal of claim 2, each side pad assembly 300-300' including a resilient pad with external reinforcing cover 320-320', the said pad being of hexagonal horizontal cross-section and forming first, second, third, fourth, fifth and sixth upright panels, each said pad being further reinforced by plural internal tie straps 340-340', each said strap being fixed rearwardly thereof to a shelter blockout and extending along the first and second panels side pad, thence through the second panel, rearwardly toward the fifth panel and fixed upon the cover thereof.

4. The shelter claim 3 wherein ends of the side panel tie straps 340-340' are respectively secured to side pads 300-300' at points which are devoid of truck contact.

5. The shelter seal of claim 4 wherein the head pad assembly 200 retains head pad curtains 150–150', depending forward and rearward of head pad 220.

6. The shelter seal of claim 5 further comprising wear pleats 140–140' depending from the head pad assembly adjacent a gap between respective side pads 300–300' and head pad 220.

7. The shelter of either claim 1, wherein the head pad assembly is covered at least in part by a translucent roofing to access daylight into the interior of the warehouse dock.

8. The shelter seal of claim 7 wherein the blockouts define ventilation louver units 114–114' with panel roll ups whereby the interior of the shelter may be optionally open to outside atmosphere during loading and/or off loading of the truck.

* * * * *